March 17, 1964    W. ILLIG ETAL    3,125,624
DEVICE FOR DETERMINING THE DIMENSIONS OF AN OBJECT
Filed March 27, 1959    3 Sheets-Sheet 1
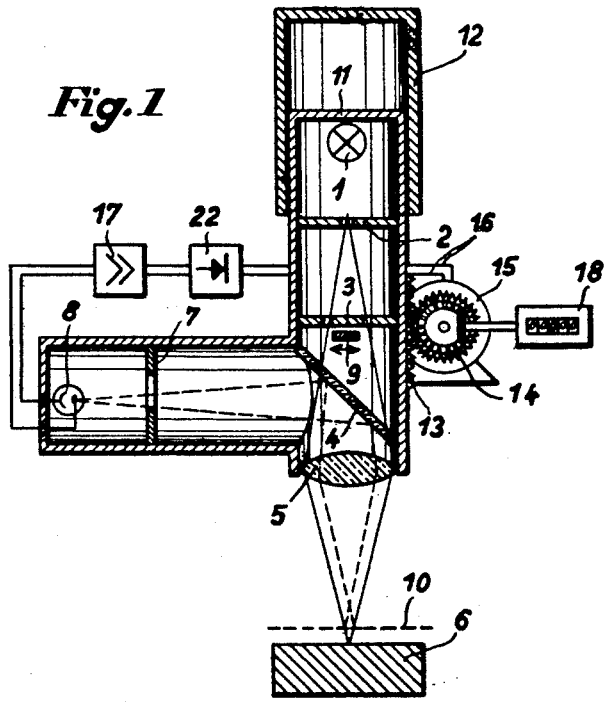
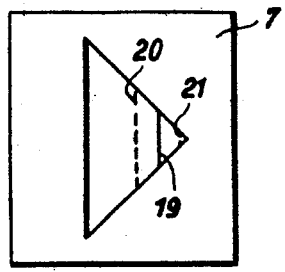
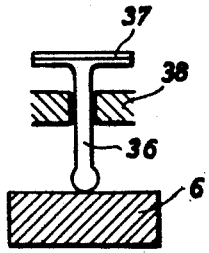

United States Patent Office 3,125,624
Patented Mar. 17, 1964

3,125,624
DEVICE FOR DETERMINING THE DIMENSIONS
OF AN OBJECT
Werner Illig, Heidenheim (Brenz), and Armin v. Hünerbein, Aalen, Germany, assignors to Carl Zeiss, Heidenheim (Brenz), Germany
Filed Mar. 27, 1959, Ser. No. 813,050
Claims priority, application Germany Mar. 29, 1958
3 Claims. (Cl. 88—14)

The invention relates to a device for determining the dimensions of an object by determining the deviation from the dimension of a standard without touching the object. The invention may be employed for all types of measurements and also for the automatic control of machines, for instance, for controlling the operation of machine tools.

Known devices for determining the dimensions of an object use a sensing lever in contact with the object. The motions of the said sensing lever are transmitted to an indicating device by mechanical or electrical means. The use of mechanical transmitting means entails the disadvantage of limiting the accuracy of the measurement. Electrical transmitting means have the disadvantage that they are rather complex and therefore expensive.

There is also known a device for determining the dimensions of an object in which a mechanical sensing lever being in contact with the object upon its axial movement shifts plane reflecting surfaces thus changing the path of light which serves to form an image of a mark upon a scale. Said device has the disadvantage that its mechanical sensing lever is subjected to a certain wear which will gradually become more troublesome when the device is used for continuous measurements.

In accordance with the present invention, the measuring device consists of a projector for producing in the plane of the surface of a gauging rule one coincident image from two light beams produced in said projector from a single slit-like source of light, a partially transmitting optical member also arranged within said projector and an observation or measuring device, said partially transmitting member projecting the light reflected by the test object upon said observation device. If the surface of the test object lies in the plane of the surface of said gauging rule, i.e., if the dimension of the object coincides with the dimension of the gauging rule then a single image is produced in the observation device. If, however, the surface of the object to be measured does not lie in the plane of the gauging rule, i.e., if the dimensions of the gauging rule and of the object differ then two luminous spots are produced in the observation device, said two luminous spots being arranged symmetrically to the single image produced when the dimensions of the gauging rule and the object are equal. From the distance between the two luminous spots the deviation of the dimension of the test object from the dimension of the gauging rule can be unequivocally derived.

For performing the measurement electrically there is arranged in the ray path of the projector a diaphragm alternately interrupting said two light beams and furthermore, behind said partially transmitting member as seen in the direction of the reflected light a diaphragm is arranged which acts in different proportion upon the two luminous spots which occur when the dimensions of the gauging rule and of the object differ. Behind said diaphragm a photo-electric receiver is arranged which is connected to an indicating device.

It is advantageous to use a triangular diaphragm for said purpose.

Instead of connecting said photo-electric receiver to an indicating device it is also possible to connect this receiver to an automatic follower device by means of which as soon as two separate luminous spots are produced either the entire measuring device or optical parts of it are shifted in such a way that the two mark luminous spots become coincident again. The amount of this shift is then a measure of the deviation of the dimension of the object from the dimension of the gauging rule.

The device according to the invention presupposes a certain minimum reflection factor of the surface of the object under test. If this reflection factor is not present it is advantageous to provide a sensing lever resting upon the object and fitted with a mirror upon the side turned towards the projector. The mirror of the said sensing lever then acts exactly like a reflecting surface.

The measuring device of the invention can be advantageously employed for individual measurements, for series control and classifying of work pieces as well as for the control of machine tools and for the control of the operation of machine tools. By suitably combining several measuring devices it is also possible to measure differences, for instance, the thickness and the diameter of work pieces.

In the accompanying drawings FIGURES 1 to 6 show embodiments of the measuring device of the invention.

FIG. 1 shows the basic design of the device according to the invention;

FIG. 2 shows an enlarged representation of the diaphragm used;

FIG. 5 shows a sensing lever used in the measurement of work pieces with insufficiently reflecting surfaces.

Figure 3:
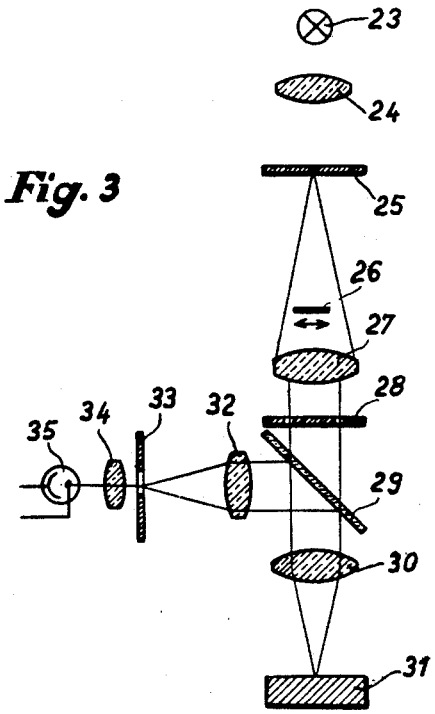
FIG. 3 shows another embodiment of the invention.

In the device illustrated in FIG. 1 a light source 1 serves for the illumination of a slit 2. This slit is projected by an objective 5 in the plane 6 which coincides with the surface of a gauging rule. Between the slit 2 and the objective 5 a diaphragm 3 is provided which divides the beam of light issuing from the slit 2 into two light beams. Said two beams form in the plane 6 one single image. A partly transmitting mirror 4 which is arranged between the diaphragm 3 and the objective 5 serves to form an image of the plane 6 in the plane of the diaphragm 7. Behind the diaphragm 7 a photo-electric cell 8 is arranged. Within the mark projector behind the diaphragm 3 a flicker diaphragm 9 is arranged which serves to interrupt alternatingly the two light beams issuing from the diaphragm 3.

The entire mark-projector is arranged in a housing 11 which can be shifted in vertical direction in a guide bush 12. A motor 15 serves to carry out said movement and has a pinion 14 arranged on its armature shaft, said pinion meshing with a rack 13 on housing 11. The motor 15 is supplied with current by the leads 16 from an amplifier 17 and a rectifier 22. The amplifier 17 serves to amplify the voltages supplied by the photo-electric cell 8 while the rectifier 22 serves to produce phase-dependent rectification of the amplified voltage. Coupled to the motor 15 is a counting mechanism 18 which indicates the revolutions made by the motor at any time. This number is a measure of the dimension of the object to be measured. Instead of the direct current motor 15 described a servo-motor which is phase-dependent in its motion may with advantage be used. In this case the rectifier 22 is not required.

The mode of operation of the device represented in FIG. 1 is as follows:

If the surface of an object to be measured is at 6, i.e., at the locus of the surface of a gauging rule then one coincident image is formed by the two light beams in the projector and realized by the two apertures of the diaphragm 3 in the said plane. In the plane of the diaphragm 7 therefore, is produced only one mark-image 19 as shown in FIG. 2. The photo-electric cell 8 will in this case supply a direct current, the motor 15 will remain at rest and the counting mechanism will register the value zero.

If now the surface of an object to be measured is shifted to the position 10 then two luminous spots will be produced in this plane and consequently also in the plane of the diaphragm 7. These luminous spots are designated by 20 and 21. By means of the flicker diaphragm 9 it is achieved that the luminous spots 20 and 21 are alternately incident upon the photo-electric cell 8. As can be seen in FIG. 2 the luminous spot 20 is stopped out to a significantly lower degree than the luminous spot 21 by the diaphragm 7. The photo-electric cell 8 supplies therefore, an alternating current voltage which is amplified in the amplifier 17. The amplified voltage is rectified by the rectifier 22 in dependence on its phase by comparison with the voltage serving to drive the flicker diaphragm 9. In the case represented in FIG. 1 the motor 15 receives a voltage of such polarity that the pinion 14 rotates in a clockwise direction and consequently shifts the entire device in vertical direction upwards until the two luminous spots coincide in the plane 10. On the counting mechanism 18 the amount of the shift of the housing 11 can be read directly and after suitable calibration the deviation of the dimension of the object to be measured from the dimension of the gauging rule can also be read directly.

Upon a downwards shift of the surface of an object to be measured the luminous spots 20 and 21 are inverted and thereby also the phase of the alternating current voltage produced. In this case the motor 15 shifts the housing 11 in a vertical direction downwards.

It is similarly possible to lead the voltage produced by the photo-electric cell 8 to an electrical indicating instrument which indicates directly the dimension of the object to be measured. In this case a follower device is not required. If the housing 11 is follower-controlled then it is possible in principle to indicate the amount of the shift in any known manner.

The device represented in FIG. 1 can with advantage be employed in a method for continuously measuring the thickness of objects. It is also possible to mount this device onto a machine tool so as to adjust the machine tool in accordance with the different positions of the housing 11. For this purpose the housing 11 will have to be provided with a contactor. It is also possible to use this device for series control and for the classifying of work pieces. If for instance, the housing 11 is connected with a contactor, when work pieces are to be classified, then a contact corresponding to the respective thickness of the work piece will be closed, and it will thus be possible, for instance, to drop work pieces into different receptacles, which correspond to the different limits of tolerance of the work pieces.

In FIG. 3 another embodiment of the device according to the invention is represented. By 23 there is designated a light source which illuminates a slit 25 by a lens 24. The said slit is imaged upon the surface 31 of an object to be measured by the lens systems represented schematically by the lenses 27 and 30. Behind the lens 27 there is arranged the slit 28 which serves to divide the light beam incident upon it into two separate light beams. A flicker diaphragm 26 serves for the alternating covering first one half and then the other half of the said light beam passing through the slit 25. Between the diaphragm 28 and the objective 30 a partially transmitting mirror 29 is arranged. The surface of the object 31 to be measured is imaged in the plane of the diaphragm 33 by the optical systems 30 and 32. The diaphragm 33 has with advantage the shape represented in FIG. 2. By a further lens 34 the light passing through the diaphragm 33 is directed into a photo-electric cell 35.

The mode of operation of the device represented in FIG. 3 corresponds exactly to that of the device represented in FIG. 1.

The only difference is that the follower control is here attained by shifting the lens 27. This lens is shifted in the direction of its optical axis until the luminous spots formed by the two light beams are again coincident in the surface of the object 31 and therefore, also in the plane of the diaphragm 33. The said shift may be carried out by an electric motor as represented in FIG. 1. If the optical data are suitably selected then the shift of the lens 27 which is proportional to the deviation of the dimension of the object from the dimension of the gauging rule is a multiple of said deviation, for instance, one hundred times that amount.

If the device represented is used for measuring greater deviations then an alteration of the magnification of the luminous spots in the longitudinal direction may have a disturbing effect. By using cylindrical lenses at suitable places for instance, by constructing the lens 30 as a cylinder lens the said alteration may be eliminated.

The device shown in FIG. 1 and the device represented in FIG. 3 may be used also without their electrical parts if the planes 7 and/or 33 are made from ground-glass screens or are observed through eyepieces. In this simpler arrangement the flicker diaphragm as well as the diaphragms 7 or 33 and the corresponding photo-electric cells are omitted.

In the surface of the object to be measured is in the same plane as the surface of the gauging rule then only a single image is visible in the eyepiece. If the surface of the object to be measured lies either above or below the said surface then two luminous spots appear whose distance from each other is a measure of the dimension of the object. Also in this case it is possible to adjust the device in such a manner that the two luminous spots coincide again either by a shift of the entire housing 11 or by a shift of the lens 27. The corresponding shift may for instance, be read directly upon a calibrated drum or on a similar device.

Figure 6:
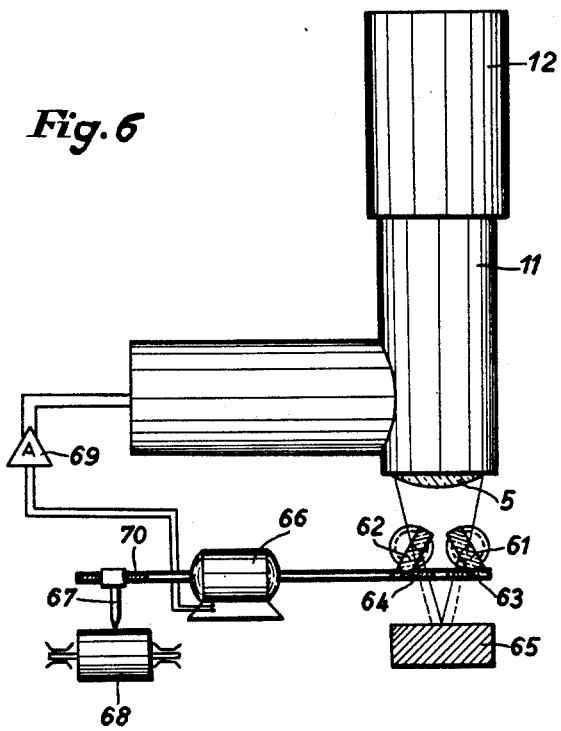
FIG. 6 shows another embodiment of the invention in which two plane parallel plates are arranged between the measuring device and the object.

In the device according to FIG. 6, oscillatable plane parallel plates 61 and 62 are arranged in the path of the two light beams emanating from the diaphragm 3 shown in FIG. 1'. If the dimensions of the object 65 to be measured and the gauging rule differ, there are produced two luminous spots on the surface of the object 65 as shown in dotted lines. Therefore, the photo-electric cell 8 mounted within the device 11 supplies an alternating current voltage which is amplified by the amplifier 69. The amplified voltage is led to the motor 66 and actuates this motor. The gearings 63 and 64 driven by the motor 66 will rotate the plane parallel plates 61 and 62 in such a manner that only one image mark will be produced on the surface of the object 65. The corresponding paths of said two light beams are shown in FIG. 6 in inked lines. When the above mentioned condition is obtained the motor 66 will stop.

A threaded spindle 70 is connected with the motor 66 in such a manner that when the motor rotates it will displace a stylus 67 along the spindle 70. This stylus draws on a rotating drum 68 a curved line or a graph corresponding to the rotative adjustment of the plane parallel plates 61 and 62. When the drum 68 is provided with an appropriate calibration the position of the stylus 67 will indicate the size or other measurement of the object 65.

The sensitivity of the devices represented in the FIGS.

1, 3 and 6 can be altered within wide limits by suitable choice of the double slit diaphragms 3 or 28 or by alteration of the objectives 5 or 30 or of suitable parts of the luminous spot-forming optical system.

If the surface of an object to be measured is not sufficiently highly reflecting a simple sensing lever may be placed upon the object to be measured one embodiment of which is represented in FIG. 5. Such a sensing lever consists of a shaft 36 resting upon the object 6 and fitted with a mirror 37 on the side turned towards the objective of the image-forming device. The suspension of the sensing lever is schematically represented by 38. The mirror 37 acts exactly like a reflecting surface wherein the distance between the surface to be measured and the mirror surface can be allowed for without difficulty.

Figure 4:
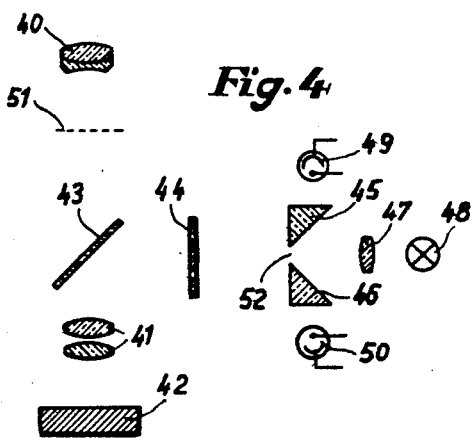
FIG. 4 shows the application of the new device for the purpose of focussing a microscope, in schematic representation.

In FIG. 4 one embodiment of the device according to the invention is represented as applied to the automatic focussing of a microscope. The microscope is schematically represented by an eyepiece 40 and an objective 41. To one side of the microscope a light source 48 is arranged which illuminates a slit 52 formed by two prism edges via a lens 47. A diaphragm 44 divides the light beam issuing from slit 52 into two light beams which produce two images of the openings of diaphragm 44 upon the surface of the object 42 via a partially transmitting mirror 43 and the objective 41. The light beams reflected at this surface are imaged in the plane of the slit 52. The plane of this slit is conjugate to the image plane 51 of the eyepiece 40.

If the surface of the object 42 does not lie in the plane of sharp focussing then two luminous spots are produced in the plane of the slit 52. The prisms 45 and 46 are so designed that they deflect these two luminous spots upon the photo-electric cells 49 and 50. Upon the sides of the prisms 45 and 46 which are turned towards the diaphragm 44 a triangular diaphragm is with advantage arranged. This diaphragm may be broken for the width of the slit 52 so that the full length of this slit may be utilized.

If two luminous spots are produced in the plane of the slit 52 then the photo-electric cells 49 and 50 receive light of different intensity and produce a follower-control of the microscope approximately in the same way as described in connection with FIG. 1. Once the correct focussing of the microscope has been obtained the light source 48 is switched off in order to avoid interference with the microscopic observation.

It is similarly possible to vary the device shown in FIG. 4 in such a way that only one photo-electric cell is required. For this purpose an illuminated slit is inserted into the plane 51 for the duration of the focussing operation. This results in an arrangement similar to that represented in FIG. 1.

We claim:

1. In a device for determining the thickness of an object by measuring its difference from the thickness of a standard object, an optical device including a light source, a single slit diaphragm illuminated by said light source, an optical lens system for producing an image of said slit diaphragm in the plane of the surface of said standard object, said optical lens system comprising two axially spaced lenses, a second diaphragm arranged between said two lenses of said optical lens system and having two slits arranged in a single plane for dividing the light beam passing through said single slit diaphragm and one of said two lenses into two light beams, a flicker diaphragm for alternately covering first one half and then the other half of the light beam passing through the single slit diaphragm, a partially transmitting reflecting means arranged between said second diaphragm and one of the two lenses of said optical lens system, and a measuring device for receiving from said partially transmitting reflecting means the light rays reflected by the surface of the object to be measured after this object has been substituted for said standard object, said surface of said object to be measured will reflect into said measuring device a pair of spaced luminous spots produced by said two light beams when the thickness of said object differs from the thickness of said standard object, means for adjusting said optical device until said two luminous spots merge into a single coincident image which appears on the surface of the object to be measured, and means for measuring the amount of adjustment made and indicating the thickness of said object.

2. A device for determining the dimensions of an object by determining the deviation from the dimension of a gauging rule, consisting of an optical device including a light source, a single slit diaphragm illuminated by said light source, an optical lens system for producing an image of said slit diaphragm in the plane of the surface of said gauging rule, said optical lens system comprising two axially spaced lenses, a second diaphragm arranged between said two lenses of said optical lens system and having two slits for dividing the light beam passing through said single slit diaphragm and one of said two lenses into two light beams, a flicker diaphragm for alternatingly covering first one half and then the other half of the light beam passing through said single slit diaphragm, a partially transmitting reflecting means arranged between said second diaphragm and one of the two lenses of said lens system; a measuring device including a diaphragm and a photo-electric receiver, said reflecting means directing into said measuring device the light which after substituting said object to be measured for said gauging rule is reflected from the surface of the object in the form of two laterally spaced luminous spots when the dimensions of said object and said gauging rule differ from each other, said diaphragm having a triangular aperture which shades off different portions of said two luminous spots, means for adjusting parts of said optical device in such a manner that said two light beams produce one coincident image on the surface of the object to be measured, said adjusting means comprising an amplifier connected to said photo-electric receiver and an electric motor connected to said amplifier, said motor when operated displacing said parts of said optical device, and means for measuring the adjustment of said parts.

3. A device for determining the dimensions of an object by determining the deviation from the dimension of a gauging rule, consisting of an optical device including a light source, a single slit diaphragm illuminated by said light source, an optical lens system for producing an image of said slit diaphragm in the plane of the surface of said gauging rule, said optical lens system comprising two axially spaced lenses, a second diaphragm arranged between said two lenses of said optical lens system and having two slits arranged in a single plane for dividing the light beams passing through said single slit diaphragm and one of said two lenses into two light beams, a flicker diaphragm for alternatingly covering first one half and then the other half of the light beam passing through said single slit diaphragm, a partially transmitting reflecting means arranged between said second diaphragm and one of said two lenses of said lens system; a measuring device including a diaphragm and a photo-electric receiver, said reflecting means directing into said measuring device the light reflected from the surface of said gauging rule and from the surface of said object to be measured after the latter has been substituted for said gauging rule, said reflected light being in the form of two laterally spaced luminous spots when the dimension of the object to be measured differs from that of said gauging rule, thereby producing in the plane of said diaphragm a second image of said luminous spots produced on the surface of the object to be measured, said diaphragm having an aperture whose dimensions at right angles along its straight center axis change from a minimum value to a maximum value, so that this aperture acts in different proportions upon two luminous spots which are produced on the surface of said object to be measured and therefore also on said diaphragm when the dimensions of said object and said gauging rule differ from each other; and means for adjusting the optical device in such a manner that only one coincident image by said two luminous spots is produced on the surface of the object to be measured, said adjusting means including an amplifier connected to said photoelectric receiver and an electric motor connected to said amplifier and serving for adjusting the optical device until said photo-electric receiver delivers only a D.C. voltage which takes place when said two luminous spots merge into a single luminous spot.

References Cited in the file of this patent

UNITED STATES PATENTS

| | | |
|---|---|---|
| 2,446,628 | Brown | Aug. 10, 1948 |
| 2,945,132 | Schuch | July 12, 1960 |

FOREIGN PATENTS

| | | |
|---|---|---|
| 591,991 | Great Britain | Sept. 4, 1947 |

OTHER REFERENCES

Focusing a High-Power Microscope, Baxter et al., Journal of the Optical Society of America, vol. 47, No. 1, January 1957, pages 76–80.